(12) United States Patent
Takata et al.

(10) Patent No.: US 9,362,726 B2
(45) Date of Patent: Jun. 7, 2016

(54) WIRING HARNESS PROTECTION MEMBER AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-shi (JP)

(72) Inventors: Yutaka Takata, Yokkaichi (JP); Shigeyuki Tanaka, Yokkaichi (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-shi (JP)

( * ) Notice: Subject to any disclaimer, the term of this patent is extended or adjusted under 35 U.S.C. 154(b) by 81 days.

(21) Appl. No.: 14/387,582

(22) PCT Filed: Feb. 21, 2013

(86) PCT No.: PCT/JP2013/054304
§ 371 (c)(1),
(2) Date: Sep. 24, 2014

(87) PCT Pub. No.: WO2013/145960
PCT Pub. Date: Oct. 3, 2013

(65) Prior Publication Data
US 2015/0053479 A1 Feb. 26, 2015

(30) Foreign Application Priority Data
Mar. 28, 2012 (JP) .................. 2012-072683

(51) Int. Cl.
*H02G 3/04* (2006.01)
*B60R 16/02* (2006.01)
(Continued)

(52) U.S. Cl.
CPC .......... *H02G 3/0412* (2013.01); *B60R 16/0215* (2013.01); *H01B 7/282* (2013.01);
(Continued)

(58) Field of Classification Search
CPC ...... H01B 7/292; H01B 7/282; H02G 3/0481; H02G 3/0418; H02G 3/0412; B60R 16/0215
USPC ..................... 174/659, 72 A, 137 R
See application file for complete search history.

(56) References Cited

U.S. PATENT DOCUMENTS

| | | | | |
|---|---|---|---|---|
| 6,553,953 | B1 * | 4/2003 | Fujihara | F02M 35/10144 123/184.21 |
| 2009/0117806 | A1 * | 5/2009 | Kaneda | B32B 5/06 442/393 |

FOREIGN PATENT DOCUMENTS

| | | |
|---|---|---|
| JP | 2003-291741 | 10/2003 |
| JP | 2006-299441 | 11/2006 |

(Continued)

*Primary Examiner* — Timothy Thompson
*Assistant Examiner* — Charles Pizzuto
(74) *Attorney, Agent, or Firm* — Gerald E. Hespos; Michael J. Porco; Matthew T. Hespos

(57) ABSTRACT

It is aimed to provide a wiring harness protection member and a wiring harness having good protection performance even when being used under high temperature and high humidity. A wiring harness 3 is formed by covering a wire bundle 4 with wiring harness protection members 2 obtained by molding nonwoven fabrics 1 made of mixed fibers containing 10 to 90 mass % of polypropylene resin fibers and 90 to 10 mass % of polyethylene terephthalate resin fibers into a predetermined shape.

2 Claims, 1 Drawing Sheet

(51) Int. Cl.
*H01B 7/29* (2006.01)
*H01B 7/282* (2006.01)
*D04H 1/4291* (2012.01)
*D04H 1/435* (2012.01)

(52) U.S. Cl.
CPC ............ *H01B 7/292* (2013.01); *H02G 3/0418* (2013.01); *H02G 3/0481* (2013.01); *D04H 1/4291* (2013.01); *D04H 1/435* (2013.01)

(56) References Cited

FOREIGN PATENT DOCUMENTS

JP  2010267412 A  *  11/2010
JP  3166607        2/2011

* cited by examiner

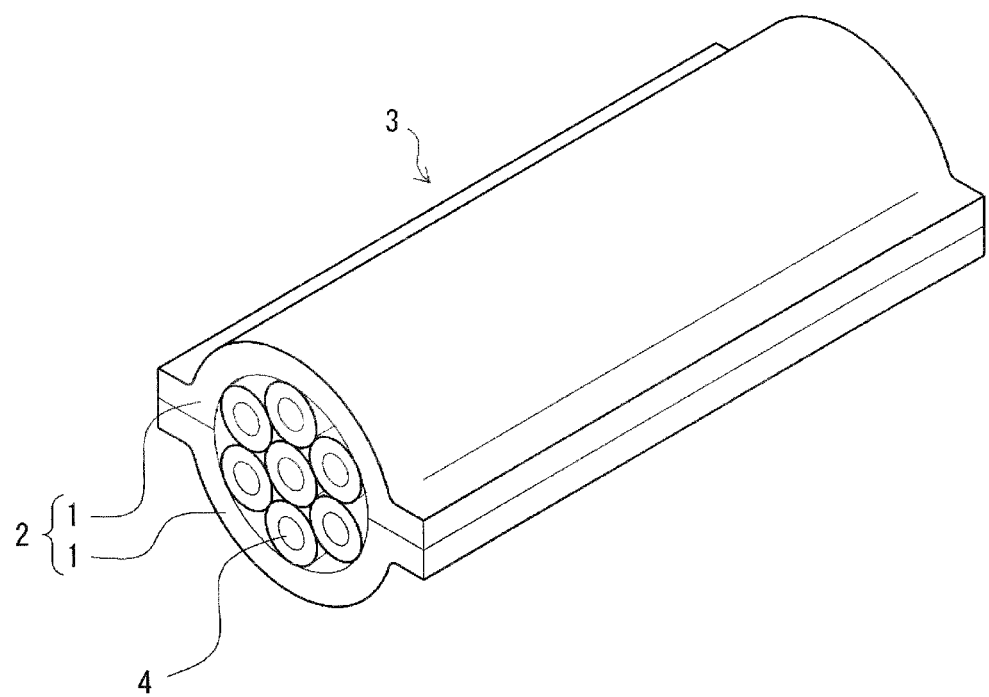

WIRING HARNESS PROTECTION MEMBER AND WIRING HARNESS

BACKGROUND

1. Field of the Invention

The present invention relates to a wiring harness protection member and a wiring harness.

2. Description of the Related Art

In recent years, there has been a progress in high performance and high functionality mainly for automotive vehicles and electric appliances. Plural wires are used for internal wiring of automotive vehicles, electric appliances and the like to accurately operate various electronics such as automotive vehicles and electric appliances. Generally, these wires are used in the form of a wiring harness.

In the wiring harness, a wire bundle composed of a plurality of wires is fabricated in a form necessary for wiring in advance. For example, the wiring harness is formed by forming necessary branching, connecting connectors and the like to ends of the wiring harness and winding a wiring harness protection member having one of various shapes such as a tape shape, a tube shape and a sheet shape around the outer periphery of the wire bundle.

Generally, a nonwoven fabric made using polyethylene terephthalate (PET) short fibers is utilized in various fields such as filter and cushion materials, vehicle interior sheet materials and vehicle interior ceiling materials. The present applicant and others previously proposed wiring harness protection members using a nonwoven fabric (see Japanese Unexamined Patent Publication No. 2010-267412).

The wiring harness protection member has a high possibility of being used in a temperature/humidity environment having high temperature and high humidity as an on-vehicle environment. Thus, in the case of a nonwoven fabric using PET short fibers, PET resin is degraded under high temperature and high humidity, and there has been a problem of possibly affecting performance as the protection member.

The present invention is designed to solve the problem of the prior art and aims to provide a wiring harness protection member and a wiring harness having good protection performance even when being used in a high-temperature and high-humidity environment.

SUMMARY OF THE INVENTION

The invention is directed to a wiring harness protection member, characterized in that a nonwoven fabric made of mixed fibers containing 10 to 90 mass % of polypropylene resin fibers and 90 to 10 mass % of polyethylene terephthalate resin fibers is molded into a predetermined shape.

In the above-described wiring harness protection member, the nonwoven fabric is a nonwoven fabric in which low melting point resin fibers are further mixed with the mixed fibers, and a mixing amount of the low melting point resin fibers can be set in a range of 5 to 80 parts by mass based on total 100 parts by mass of the polypropylene resin fibers and the polyethylene terephthalate resin fibers.

The invention also is directed to a wiring harness, characterized in that a wire bundle is covered with a wiring harness protection member obtained by molding a nonwoven fabric made of mixed fibers containing 10 to 90 mass % of polypropylene resin fibers and 90 to 10 mass % of polyethylene terephthalate resin fibers into a predetermined shape.

In the above-described wiring harness, the wiring harness protection member uses a nonwoven fabric in which low melting point resin fibers are further mixed with the mixed fibers, and a mixing amount of the low melting point resin fibers can be set in a range of 5 to 80 parts by mass based on total 100 parts by mass of the polypropylene resin fibers and the polyethylene terephthalate resin fibers.

Since the present invention uses the nonwoven fabric made of the mixed fibers containing 10 to 90 mass % of polypropylene resin fibers and 90 to 10 mass % of polyethylene terephthalate resin fibers, it is possible to obtain a wiring harness protection member and a wiring harness having good protection performance even when being used under high temperature and high humidity as compared with the case of using a nonwoven fabric made only of polyethylene terephthalate resin fibers.

BRIEF DESCRIPTION OF THE DRAWINGS

FIG. 1 is an external perspective view showing an example of a wiring harness of the present invention.

DETAILED DESCRIPTION

Hereinafter, an embodiment of the present invention is described with reference to the drawing. FIG. 1 is an external perspective view showing an example of a wiring harness of the present invention. As shown in FIG. 1, a wiring harness 3 is formed by covering a wire bundle 4 with wiring harness protection members 2 obtained by molding nonwoven fabrics 1, 1 into a predetermined shape. The wiring harness protection members 2, 2 shown in FIG. 1 are molded in advance to have a recessed groove-like cross-sectional shape.

The wiring harness protection member 2 is formed by thermally molding a nonwoven fabric made of mixed fibers containing 10 to 90 mass % of polypropylene resin fibers (hereinafter, may also be referred to as PP resin fibers) and 90 to 10 mass % of polyethylene terephthalate resin fibers (hereinafter, may also be referred to as PET resin fibers) into a predetermined shape. The wiring harness protection member 2 has a function to retain the shape of the wiring harness 3 and a function as a protection member for the wire bundle 4.

The wiring harness protection member 2 can prevent performance reductions of the PET resin fibers such as a strength reduction and an abrasion resistance reduction under high temperature and high humidity and can satisfy performances necessary as the protection member since the nonwoven fabric 1 contains 10 mass % or more of PP resin fibers. Further, since the nonwoven fabric 1 contains 90 mass % or less of PP resin fibers, the PP resin fibers can function as a binder and can ensure thermal moldability.

A further preferred ratio of the mixed fibers is in a range of 10 to 50 mass % of PP resin fibers and in a range of 90 to 50 mass % of PET resin fibers.

If there are more PP resin fibers and less PET resin fibers in the nonwoven fabric, this nonwoven fabric has lower thermal moldability as compared with a nonwoven fabric using only PET resin fibers. Contrary to this, thermal moldability can be improved by adding low melting point resin fibers as a third component other than the PP resin fibers and PET resin fibers to the nonwoven fabric. A mixing amount of low melting point resin fibers in the nonwoven fabric is in a range of 5 to 80 parts by mass based on 100 parts by mass of the mixed fibers composed of the PP resin fibers and the PET resin fibers.

If the mixing amount of the low melting point fibers is below 5 parts by mass based on 100 parts by mass of the mixed fibers, a moldability improving effect may not be obtained. If the mixing amount is above 80 parts by mass, various physical properties are reduced and a protection function as the wiring harness protection member may not be fully exhibited in the case of use as the wiring harness protection member.

A further preferred mixing amount of the low melting point fibers in the nonwoven fabric is in a range of 5.0 to 66.6 parts by mass based on 100 parts by mass of the mixed fibers.

Binder fibers having a core-sheath structure in which a fiber of a core part is covered with a binder layer of a sheath part can be used as low melting point fibers. Low melting point resin having a lower softening point than the fiber of the core part is used as resin for the binder layer of the binder fiber.

Examples of the binder layer of the low melting point fiber may include copolymer of polyethylene isophthalate (PEI) and PET, polyethylene resin, polypropylene resin and polyolefin-based resin. Further, a PET resin fiber is used as the fiber of the core part of the low melting point resin. For example, by mixing low melting point PET resin fibers, moldability equivalent to that in the case of using a nonwoven fabric made only of PET resin fibers can be achieved while keeping hydrolysis resistance of the nonwoven fabric.

Note that the thermal moldability of the nonwoven fabric 1 means that the nonwoven fabric has such thermoplasticity that it can be molded into a predetermined shape by being heated. If the thermally moldable nonwoven fabric is used, the wiring harness protection member can be easily formed into a predetermined shape.

A nonwoven fabric having a basis weight of 100 to 2000 g/m2 and a thickness of 0.1 to 30 mm is used as the nonwoven fabric 1. The fibers constituting the nonwoven fabric are single fibers having a fiber diameter of 1 to 40 denier and a fiber length of 30 to 120 mm. Examples of the fiber shape may include a cylindrical shape, a hollow shape, a side-by-side shape and a core-sheath shape. Further, modified cross-section fibers having different fiber shapes may be used as the fibers.

The nonwoven fabric 1 can be fabricated by needle punching or spunbonding using the above PP resin fibers, PET resin fibers, low melting point fibers and the like.

As shown in FIG. 1, the wiring harness 3 is formed by covering the wire bundle 4 as a bundle of a plurality of wires with the wiring harness protection members 2. The wiring harness protection members 2 are formed by molding the above nonwoven fabrics into a predetermined shape.

To manufacture the wiring harness 3, for example, a predetermined forming mold composed of upper and lower molds separated at upper and lower sides is used, the nonwoven fabrics 1 are arranged to face each other in the upper and lower molds, and the nonwoven fabrics 1, 1 are molded by being heated in a state where the forming mold is clamped and the wire bundle 4 is sandwiched between the two nonwoven fabrics 1, 1. During molding, jaw parts of the nonwoven fabrics 1, 1 projecting outwardly of the wire bundle 4 are bonded.

The wiring harness of the present invention is not limited to the above form. Although not particularly shown, the wiring harness may be formed by performing thermal molding with one nonwoven fabric 1 wound around the wire bundle 4 and forming the wiring harness protection member 2 into a predetermined shape. Further, the wiring harness protection member 2 may be divided into two members in advance by molding the nonwoven fabrics 1 into a predetermined recessed groove shape. The wiring harness 3 can be formed by sandwiching the wire bundle 4 between the divided parts of the wiring harness protection member 2.

The wiring harness of the present invention can be suitably used as a wiring harness for automotive vehicle or the like.

EXAMPLES

Examples and comparative examples of the present invention are described below. Note that the present invention is not limited to these examples.

Examples 1 to 5, Comparative Examples 1, 2

Nonwoven fabrics in which (A) PP fibers (PP resin fibers) and (B) PET fibers (PET resin fibers) were mixed in compositions shown in TABLE-1 were used as test pieces of the wiring harness protection member. The test pieces used were molded into a sheet shape. A high-temperature/high-humidity test was conducted on the test pieces at a temperature of 80° C. and a humidity of 100% for 500 hours in accordance with JIS C 60068 3-4 using a high-temperature/high-humidity testing machine. For the test pieces, tensile strength was measured before the test (initial stage) and after the test (after the high-temperature/high-humidity test), an abrasion resistance test was conducted, and tensile strength and abrasion resistance were evaluated. An evaluation result is also shown in TABLE-1. A test method and an evaluation method are as described below.

[Tensile Test]

A tensile test was conducted to measure tensile strength in accordance with JIS K 6251. The result of the tensile test was evaluated to be good (○) when the tensile strength of the test piece after the high-temperature/high-humidity test was higher than 50% of the tensile strength of the test piece in the initial stage and to be not good (x) unless otherwise.

[Abrasion Resistance Test]

An abrasion resistance test was conducted in accordance with JIS K 7218. The result of the test was evaluated to be good (○) when the number of reciprocations at which the test piece after the high-temperature/high-humidity test had a predetermined abrasion amount is equal to or larger than the number of reciprocations at which the test piece in the initial stage had the predetermined abrasion amount and to be not good (x) unless otherwise.

TABLE-1

|  | Examples | | | | | C. Example | |
| --- | --- | --- | --- | --- | --- | --- | --- |
|  | 1 | 2 | 3 | 4 | 5 | 1 | 2 |
| Fiber Mixing Ratio of Nonwoven Fabric | | | | | | | |
| (A) PET Fibers (Mass %) | 90 | 70 | 50 | 30 | 10 | 100 | 95 |
| (B) PP Fibers (Mass %) | 10 | 30 | 50 | 70 | 90 | 0 | 5 |
| Durability Test Result | | | | | | | |
| Tensile Strength | ○ | ○ | ○ | ○ | ○ | x | x |
| Abrasion resistance test result | ○ | ○ | ○ | ○ | ○ | x | x |
| Judgment | ○ | ○ | ○ | ○ | ○ | x | x |

As shown in TABLE-1, Examples 1 to 5 were wiring harnesses excellent in properties even after the high-temperature/high-humidity test since the nonwoven fabrics contained 10 to 90 mass % of PP resin fibers. Since a nonwoven fabric made of 100% of PET resin fibers was used in Comparative Example 1 of TABLE-1, performance reductions were seen after the high-temperature/high-humidity test. Since 5 mass % of PP resin fibers were contained in Comparative Example 1, performances were insufficient.

Examples 6 to 10, Reference Example 1

Nonwoven fabrics in which (A) PP fibers (PP resin fibers), (B) PET fibers (PET resin fibers) and (C) low melting point PET fibers (low melting point resin fibers) were mixed in compositions shown in TABLE-2 were used as test pieces of the wiring harness protection member. The low melting point PET fiber is a fiber in which a PET fiber (melting point of 255° C.) is covered with a binder layer made of copolymer of PEI/PET (melting point of 110° C.). A high-temperature/high-humidity test was conducted on the testing pieces as in Examples 1 to 5, tensile strength was measured before and after the test, an abrasion resistance test and a test for moldability were conducted, and tensile strength, abrasion resistance and moldability were evaluated. An evaluation result is also shown in TABLE-2. Test methods for tensile strength and abrasion resistance are as described above and a test method for moldability and an evaluation method are as described below.

[Moldability Test Method]

A test body (press-molded article) was obtained by bonding two nonwoven fabrics and pressing them into a sheet at 200° C. The presence or absence of creases, peeling, burn and the like on a surface of the press-molded article was visually observed. The result of the test was evaluated to be good (○) when none of the above failures was confirmed on the sheet surface of the press-molded article and to be not good (x) unless otherwise.

TABLE-2

|  | Examples | | | | | R. Exa. |
|---|---|---|---|---|---|---|
|  | 6 | 7 | 8 | 9 | 10 | 1 |
| Fiber Mixing Ratio of Nonwoven Fabric | | | | | | |
| (A) PET Fibers (Mass %) | 47.5 | 45 | 40 | 35 | 30 | 25 |
| (B) PP Fibers (Mass %) | 47.5 | 45 | 40 | 35 | 30 | 25 |
| (C) Low Melting Point PET Fibers (Mass %) | 5 | 10 | 20 | 30 | 40 | 50 |
| Parts by Mass based on (A) + (B) = 100 Parts by Mass | 5.3 | 11.1 | 25 | 42.9 | 66.6 | 100 |
| Test Results | | | | | | |
| Tensile Strength | ○ | ○ | ○ | ○ | ○ | x |
| Abrasion resistance test result | ○ | ○ | ○ | ○ | ○ | x |
| Moldability | ○ | ○ | ○ | ○ | ○ | ○ |
| Judgment | ○ | ○ | ○ | ○ | ○ | x |

As shown in TABLE-2, Examples 6 to 10 were good in any of tensile strength, abrasion resistance and moldability. In Reference Example 1, the mixing amount of the low melting point resin fibers as the third component is further increased as compared with Examples 6 to 10. If the mixing amount of the low melting point resin fibers becomes excessive beyond a certain amount, properties other than moldability such as tensile strength and abrasion resistance are reduced.

Although the examples of the present invention have been described in detail above, the present invention is not limited to the above examples and various changes can be made without departing from the gist of the present invention.

The invention claimed is:

1. A wiring harness protection member, comprising:
a nonwoven fabric made of:
mixed fibers containing 10 to 90 mass % of polypropylene resin fibers and 90 to 10 mass % of polyethylene terephthalate resin fibers; and
low melting point resin fibers mixed with the mixed fibers, so that a mixing amount of the low melting point resin fibers is set in a range of 5 to 80 parts by mass based on total 100 parts by mass of the polypropylene resin fibers and the polyethylene terephthalate resin fibers, the nonwoven fabric being molded into a predetermined shape.

2. A wiring harness, comprising:
a wire bundle; and
a wiring harness protection member covering the wire bundle, the wire harness protection member being obtained by molding a nonwoven fabric into a predetermined shape, nonwoven fabric being made of:
mixed fibers containing 10 to 90 mass % of polypropylene resin fibers and 90 to 10 mass % of polyethylene terephthalate resin fibers into a predetermined shape; and
low melting point resin fibers mixed with the mixed fibers, and a mixing amount of the low melting point resin fibers is in a range of 5 to 80 parts by mass based on total 100 parts by mass of the polypropylene resin fibers and the polyethylene terephthalate resin fibers.

* * * * *